(12) United States Patent
Ertas et al.

(10) Patent No.: US 9,482,274 B2
(45) Date of Patent: Nov. 1, 2016

(54) COMPLIANT HYBRID GAS LUBRICATED THRUST BEARING

(71) Applicant: GENERAL ELECTRIC COMPANY, Schenectady, NY (US)

(72) Inventors: Bugra Han Ertas, Slingerlands, NY (US); Adolfo Delgado Marquez, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 44 days.

(21) Appl. No.: 14/553,746

(22) Filed: Nov. 25, 2014

(65) Prior Publication Data

US 2016/0146248 A1    May 26, 2016

(51) Int. Cl.
| | | |
|---|---|---|
| F16C 32/06 | (2006.01) | |
| F01D 25/16 | (2006.01) | |
| F01D 25/22 | (2006.01) | |
| F16C 17/06 | (2006.01) | |
| F16C 27/02 | (2006.01) | |

(52) U.S. Cl.
CPC ......... *F16C 32/0622* (2013.01); *F01D 25/164* (2013.01); *F01D 25/22* (2013.01); *F16C 17/065* (2013.01); *F16C 27/02* (2013.01); *F16C 32/0618* (2013.01); *F16C 32/0662* (2013.01); *F16C 32/0666* (2013.01); *F16C 32/0677* (2013.01); *F16C 32/0692* (2013.01); *F16C 2360/23* (2013.01)

(58) Field of Classification Search
CPC ............ F16C 32/0622; F16C 32/0666; F16C 32/067; F16C 32/0677; F16C 32/0692
See application file for complete search history.

(56) References Cited

U.S. PATENT DOCUMENTS

| | | | |
|---|---|---|---|
| 3,867,725 A * | 2/1975 | Janssen | F16C 32/0603 360/271.7 |
| 4,743,125 A | 5/1988 | Dammel et al. | |
| 4,806,023 A | 2/1989 | Cragel | |
| 4,915,510 A * | 4/1990 | Arvidsson | F16C 23/02 384/121 |
| 5,584,582 A | 12/1996 | Brown | |
| 6,527,446 B2 | 3/2003 | Lee et al. | |
| 8,083,413 B2 | 12/2011 | Ertas | |
| 2002/0009361 A1* | 1/2002 | Reichert | F01D 11/22 415/110 |
| 2009/0304313 A1* | 12/2009 | Ertas | F16C 17/035 384/99 |
| 2014/0199006 A1 | 7/2014 | Park et al. | |

FOREIGN PATENT DOCUMENTS

| | | |
|---|---|---|
| CN | 103047281 A | 4/2013 |
| EP | 0212091 A1 | 3/1987 |
| EP | 1790833 A2 | 5/2007 |
| EP | 2187072 B1 | 9/2012 |
| FR | 1086804 A | 2/1955 |
| GB | 1012839 A | 12/1965 |
| WO | 9505547 A1 | 2/1995 |
| WO | 2014062373 A1 | 4/2014 |
| WO | 2014066080 A1 | 5/2014 |

OTHER PUBLICATIONS

Ertas, Burga H.; Compliant Hybrid Journal Bearings Using Integral Wire Mesh Dampers; Journal of Engineering for Gas Turbines and Power, vol. 131, Issue 2, 11 pages.

(Continued)

*Primary Examiner* — Thomas R. Hannon
(74) *Attorney, Agent, or Firm* — Fletcher Yoder, P.C.

(57) ABSTRACT

Provided herein is a thrust bearing. The bearing includes one or more bearing pads, each with a thrust face, attached to a compliant bearing housing, a system for delivering a pressurized gas lubricant to the thrust face of the bearing pads, and a damping system that operates in parallel with the compliant bearing housing.

20 Claims, 8 Drawing Sheets

(56) References Cited

OTHER PUBLICATIONS

Looser, A., et al; A hybrid bearing concept for high-speed applications employing aerodynamic gas-bearings and a self-sensing active magnetic damper; IECON 2011—37th Annual Conference IEEE Industrial Electronics Society, Nov. 7-10, 2011, pp. 1689-1691.

PCT Search Report and Written Opinion issued in connection with corresponding PCT Application No. PCT/US2015/060539 on Feb. 5, 2016.

* cited by examiner

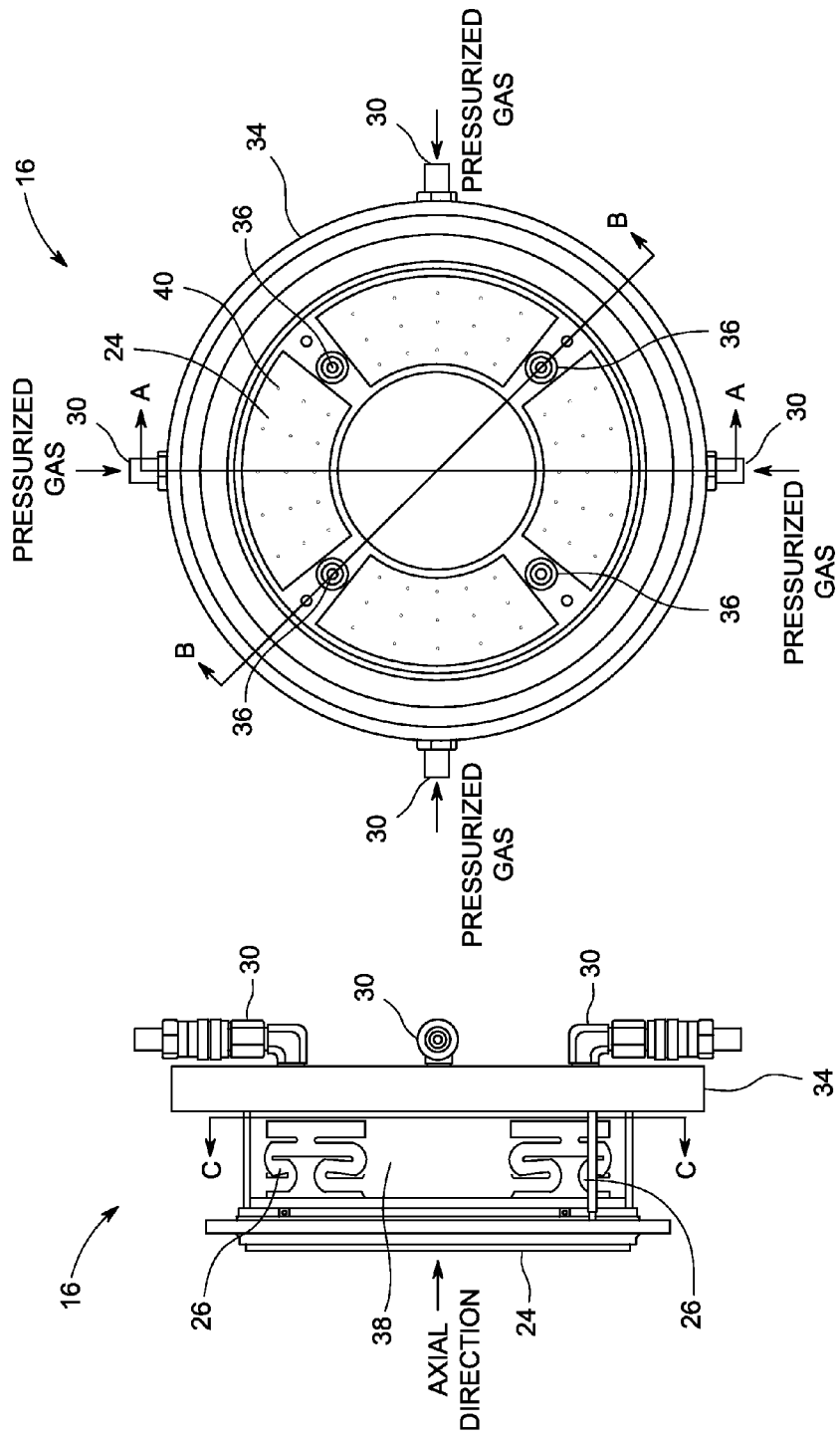

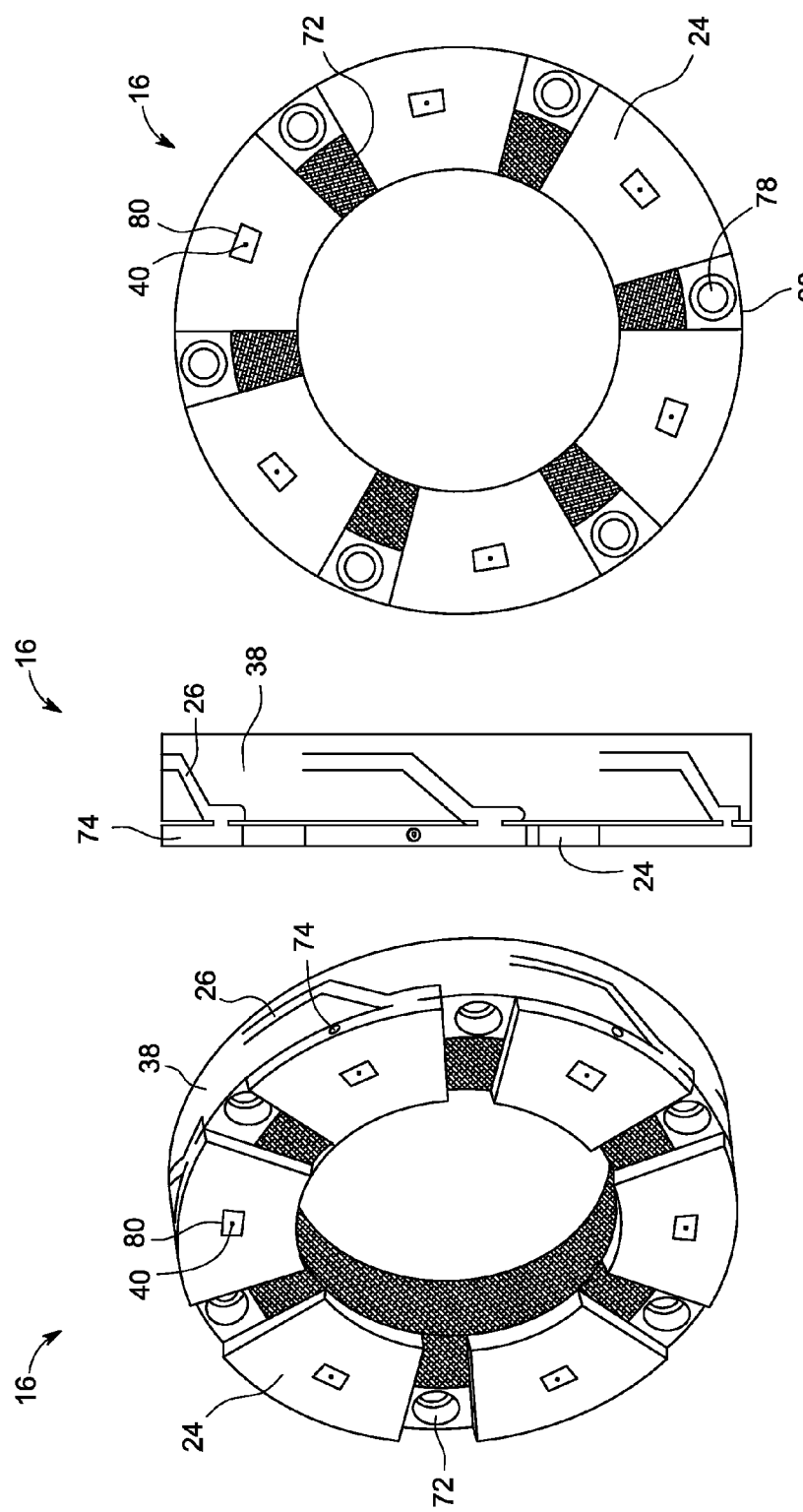

COMPLIANT HYBRID GAS LUBRICATED THRUST BEARING

BACKGROUND

The subject matter disclosed herein relates to thrust bearings for use in turbomachinery or other rotating equipment.

Turbomachinery is found in aircraft engines, steam turbines, gas turbines, compressors, and various other applications. Differences in pressure created within a piece of turbomachinery result in axial thrust. For example, in a centrifugal compressor, pressure differences between the stages of the compressor create thrust along the axis of the rotor. Thrust bearings are frequently used to hold the rotor in place and allow it to rotate.

Oil-lubricated thrust bearings have typically been used in turbomachinery. In general, the higher the viscosity of the lubricating oil, the higher the load the bearing can support. However, oil-lubricated bearings can require a large number of ancillary parts, such as seals, due to the desire to keep the working fluid of the machine separate from the oil. Moreover, oil-lubricated bearings require complex lubrication systems that may include pumps, filters, external piping, heat exchangers, and sensors. The common requirement of separating the working fluid from oil limits the use of oil-lubricated bearings when considering hermetically sealed machines without ancillary sealing components. Furthermore, oil lubricants can have unfavorable reactions with process gasses, such as $CO_2$.

BRIEF DESCRIPTION

In one embodiment, the system is a gas lubricated thrust bearing. The thrust bearing includes a compliant bearing housing, one or more bearing pads attached to the bearing housing, each bearing pad having a thrust face, a gas delivery system to supply pressurized gas to the thrust face of the bearing pads, and a damping system that operates in parallel with the compliant bearing housing.

In another embodiment, the system is a gas-lubricated thrust bearing having a thrust face, a gas delivery system to supply pressurized gas lubricant to the thrust face, one or more compliant springs, and a damping system that operates in parallel with the compliant springs.

In another embodiment, the system is a turbomachine having a thrust bearing with one or more bearing pads, each with a thrust face, a gas delivery system to supply pressurized gas lubricant to the thrust face of the bearing pads, a compliant bearing housing attached to the bearing pads, and a damping system that operates in parallel with the compliant bearing housing.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3A is a side view of an embodiment of a hybrid thrust bearing in accordance with aspects of the present disclosure;

FIG. 3B is a front view of an embodiment of a hybrid thrust bearing in accordance with aspects of the present disclosure;

FIG. 8A is a perspective view showing an embodiment of a hybrid thrust bearing having a wire mesh damper and a cantilevered beam support in accordance with aspects of the present disclosure;

FIG. 8B is a side view of an embodiment of a hybrid thrust bearing having a wire mesh damper and a cantilevered beam support in accordance with aspects of the present disclosure;

FIG. 8C is a front view of an embodiment of a hybrid thrust bearing having a wire mesh damper and a cantilevered beam support in accordance with aspects of the present disclosure.

DETAILED DESCRIPTION

Figure 1:
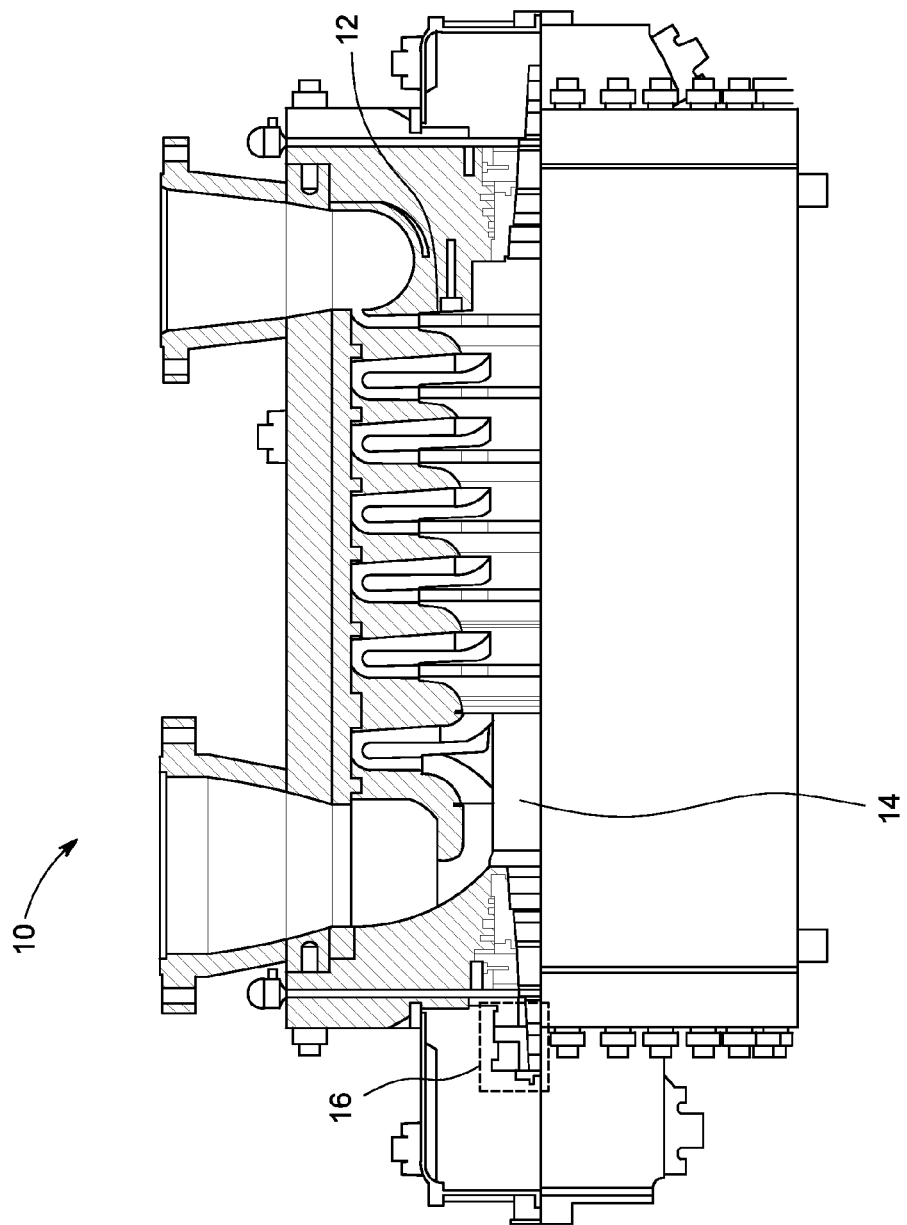
FIG. 1 illustrates an embodiment of a turbomachine in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The desire to remove oil lubricated bearings from turbomachinery has led to exploration of and development of gas-lubricated bearings. Historically, gas-lubricated thrust bearings have relied on either hydrodynamic action or hydrostatic pressurization to support thrust loads.

Conventional fixed geometry hydrodynamic gas-lubricated thrust bearings utilize a thin gas film to lubricate the bearing. Because gas lubricants have a lower viscosity than oil lubricants, hydrodynamic gas-lubricated bearings require very small operating clearances to support substantial loads. Machining parts to such tight tolerances is difficult and very expensive. As a result, parallelism, alignment, and operating deflections present significant challenges for hydrodynamic gas-lubricated bearings, which makes implementation into large machinery extremely difficult. Bearing designers deal with this problem by using compliant mechanical elements to allow for changes in rotor geometry and operating clearances, similar to design concepts utilized with thrust foil bearings. Because the compliant mechanical elements are "softer" than the gas film, the compliant mechanical elements absorb misalignment or deflections in the system, thus maintaining a healthy gas film. While the use of compliant mechanical elements allows the bearings to sustain longer life spans, as well as operate at higher temperatures and higher speeds, hydrodynamic gas-lubricated thrust bearings are limited to machines in the 200-300 kW range due to the load carrying capability of a hydrodynamic gas film.

Gas-lubricated bearings utilizing hydrostatic pressure, on the other hand, use an externally pressurized lubricating film to increase the load capacity of the bearing without requiring rotation. Gas-lubricated bearings utilizing hydrostatic pressure do not have compliant mechanical elements. The lack of compliance in Gas-lubricated bearings utilizing hydrostatic pressure limits their application to small systems with low operating temperatures and low speeds. Furthermore, the lack of compliance can lead to edge loading, wear, and catastrophic seizure.

Gas-lubricated bearings utilizing hydrostatic pressure can also suffer from a phenomenon called "pneumatic hammer". Because the gas lubricant is compressible, variations in pressure can cause instability, which can be highly destructive. As such, avoiding pneumatic hammer in hydrostatic gas-lubricated bearings requires careful control of operating conditions.

Gas-lubricated thrust bearing does not exist for use in high powered (greater than 3,000 kW) turbomachinery that can withstand high loads, high speeds, and high operating temperatures.

As described in detail below, provided herein are embodiments of gas-lubricated "hybrid" thrust bearings that utilize both hydrodynamic action and hydrostatic pressure, and are suitable for use in high powered (in excess of 300 kW) turbomachinery. Embodiments of the gas-lubricated thrust bearing may include an externally pressurized gas lubricant, some form of mechanical compliance, and damping. For example, in some embodiments, mechanical compliance may be achieved by electrical discharge machining (EDM) of bearing structures in order to make the structures compliant. In some embodiments, damping may be achieved by two or more hermetically sealed volumes and plungers that allow and restrict fluid flow between the volumes. Alternatively, in other embodiments, damping may be achieved by using a wire mesh damping system.

Turning now to the drawings, FIG. 1 illustrates an embodiment of a turbomachine 10. Turbomachine 10 has one or more stages 12, along rotor 14. At the end of rotor 14 is hybrid thrust bearing 16. FIG. 1 shows a centrifugal compressor as a specific example of a turbomachine 10. However, other examples of a suitable turbomachine 10 include, but are not limited to other types of compressors, turbines, pumps, or other industrial or commercial turbomachinery. The turbomachine 10 shown is about 2 meters long and weighs about 225 kilograms. Though turbomachine 10 is shown having 7 stages 12, the turbomachine could gave any number of stages 12, for example 2, 5, 10, 12, or 14 stages. During operation, the stages 12 of turbomachine 10 create differences in pressure between stages 12, which creates pressure forces. Pressure forces result in thrust along the axis of the rotor 14. A hybrid thrust bearing 16 at the end of rotor 14 holds rotor 14 in place and allows rotor 14 to spin. In general, higher powered turbomachines 10, generate more thrust. Thus, higher powered turbomachines 10 require hybrid thrust bearings 16 with a higher load carrying capacity.

Gas-lubricated thrust bearings presently available rely on either hydrodynamic action or hydrostatic pressurization and are only suitable for use in turbomachinery in very limited applications. Bearings utilizing conventional hydrodynamic action are limited to turbomachines in the 200-300 kW range because the low viscosity of gas lubricants limits the load capacity. Bearings utilizing hydrostatic pressure, on the other hand, are limited to small systems that operate at low temperatures and low speeds because of a lack of compliance build into the system. This lack of compliance can lead to edge loading, wear, and catastrophic seizure, which limit the lifespan of the bearing. Bearings relying on hydrostatic pressurization can also suffer from pneumatic hammer. The present approach utilizes a gas lubricated "hybrid" thrust bearing suitable for use in high powered turbomachines (more than 300 kW) that utilizes both hydrodynamic action and hydrostatic pressurization, and prevents pneumatic hammer.

Figure 2:
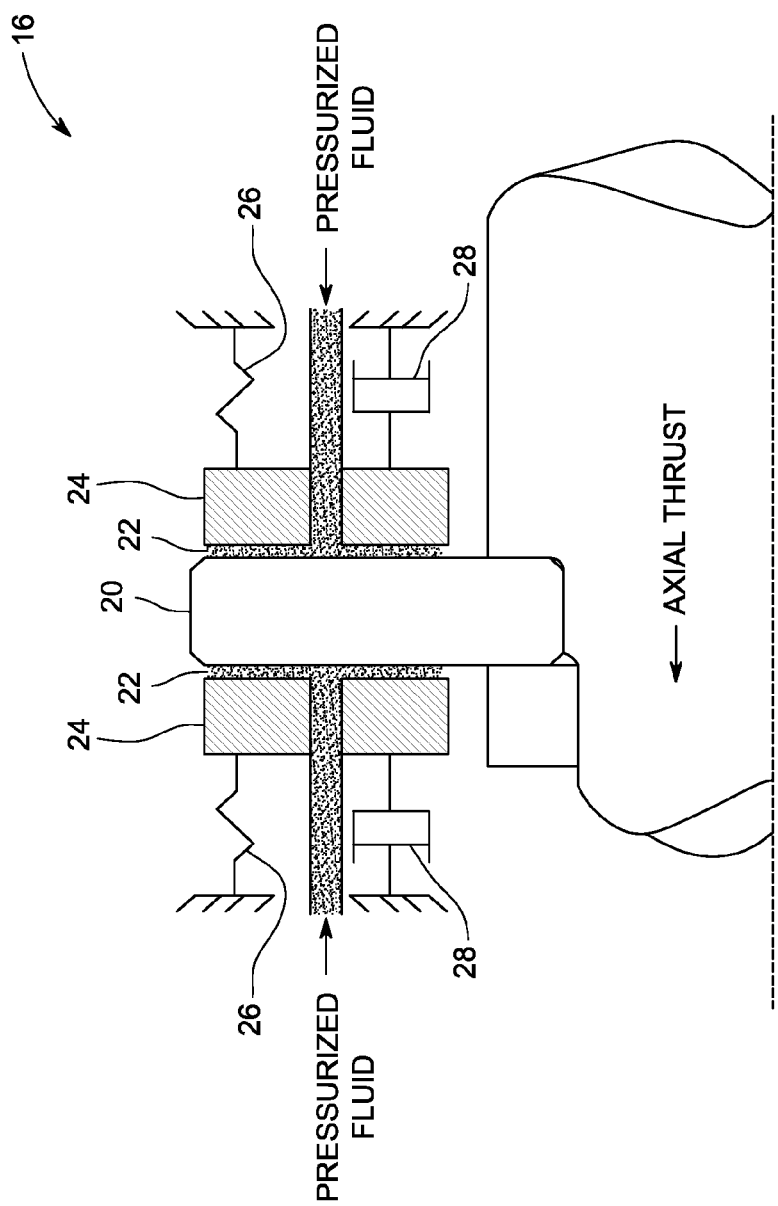
FIG. 2 is a schematic of an embodiment of a hybrid thrust bearing in accordance with aspects of the present disclosure.

FIG. 2 is a schematic of an embodiment of hybrid thrust bearing 16. The hybrid thrust bearing 16 shown in FIG. 2 has bearing runner 20 that spins with rotor 14. On either side of bearing runner 20 is a layer of pressurized gas lubricant 22, one or more bearing pads 24, one or more compliant springs 26, and one or more dampers 28. As will be discussed later, there may be a single O-shaped bearing pad 24 on either side of the bearing runner 20, or there may be multiple bearing pads 24, split into sectors, or some other configuration. In some embodiments, the bearing pad 24 may be made of a gas-permeable porous media, such that pressurized gas lubricant 22 flows through the bearing pads 24.

The compliant spring 26 supports the static load on the system and the damper 28 mitigates vibration. A bearing that relies solely on hydrodynamic action (i.e., a bearing without pressurized gas lubricant 22), can bear no load without rotation. As rotor 14 and bearing runner 20 rotate relative to bearing pads 24, the pressurized gas lubricant 22 forms a thin gas film that can bear load. In the embodiment shown in FIG. 2, any misalignment between bearing runner 20 and bearing pad 24 is "absorbed" by compliant spring 26 because compliant spring 26 is softer than pressurized gas lubricant 22, allowing a healthy film of pressurized gas lubricant 22 to be maintained. Though compliant spring 26 may be an actual helical coil spring, it is not necessarily a spring, but merely any feature that provides compliance for the system. For example, compliant spring 26 may be a feature cut into the bearing housing by EDM, milling, or some other method that results in a compliant bearing housing. Furthermore, it should be understood that even though FIG. 2 shows a single compliant spring 26 on either side of the bearing, a bearing may have any number of compliant springs 26, or a compliant structure (bearing housing 38) with one or more machined features. For example, each side of the bearing may have 1, 2, 4, 6, 8, or 10 complaint springs 26. Additionally, there need not be the same number of springs on either side of bearing runner 20.

By using pressurized gas lubricant 22, hybrid thrust bearing 16 also utilizes hydrostatic pressure. With pressurized gas lubricant 22, the hybrid thrust bearing 16 can support some thrust load even when rotor 14 is not rotating. Thus, because of the pressurized gas lubricant 22, the hybrid thrust bearing 16 can support a base thrust load without rotation of the rotor 14. When the rotor 14 begins to rotate, the hydrodynamic action of the hybrid thrust bearing 16 increases the load carrying capacity of the hybrid thrust bearing 16 beyond the load that the pressurized gas lubricant 22 can bear. By utilizing both hydrostatic pressurization and hydrodynamic action, hybrid thrust bearing 16 can withstand the higher speeds, higher operating temperatures, and higher thrust loads that are common in high powered turbomachinery.

Pressurized gas lubricant 22 may be a process gas, such as $CO_2$, or any other gas suitable for use as a lubricant in bearings. In one embodiment, pressurized gas lubricant 22 may be drawn off a location within turbomachine 10, another turbomachine, or some other available process. Pressurized gas lubricant 22 may be pressurized by another compressor, a pressurized tank, or with pressure drawn off some location in turbomachine 10, or another turbomachine. Furthermore, for start-up, the pressure may be obtained from a buffer tank, another turbomachine, or any other suitable pressurized source. Similarly, shut down of the turbomachine 10 may include pressurizing a buffer tank to be subsequently used to provide pressurized gas lubricant 22 before the next start-up.

In one embodiment, damper 28 is used to prevent pneumatic hammer in hybrid thrust bearing 16. By dissipating energy and resisting vibratory velocity of the system, damper 28 minimizes the effect of the instability on the hybrid thrust bearing 16 that comes from pressurizing a compressible gas, in this case pressurized gas lubricant 22. Damping of hybrid thrust bearing 16 can be accomplished in many different ways. For example, damping of hybrid thrust bearing 16 may be accomplished by having two or more hermetically sealed volumes and a plunger that allows and restricts fluid flow between the volumes. In the alternative, hybrid thrust bearing 16 may utilize wire mesh to accomplish damping through cyclic deformation (structural damping) and Coulomb damping. The specifics of these and other damping methods will be discussed in more detail when particular embodiments are described. Hybrid thrust bearing 16 may include one or more damping structures on either side of bearing runner 20.

FIGS. 3A and 3B show a side view and a front view of one embodiment of hybrid thrust bearing 16. It should be noted that FIGS. 3A and 3B are merely possible embodiments and not intended to limit the scope of the claims. FIG. 3A is a side view of an embodiment of a hybrid thrust bearing 16. The embodiment illustrated in FIG. 3A includes bearing pads 24, compliant springs 26 machined into bearing housing 38, gas inlets 30, back plate 34, mounting studs 36, and gas delivery orifices 40. Bearing pads 24 face bearing runner 20 and pressurized gas lubricant 22. Bearing pads 24 are connected to bearing housing 28, which has spring 26 and damper 28 elements. In this particular embodiment, compliant springs 26 are integrally machined into bearing housing 38 by EDM resulting in S-shaped compliant springs 26 that are compliant in the axial direction. Compliant springs 26 are compliant such that bearing pads 24 and base plate 34 can move relative to one another. FIG. 3A also depicts gas inlet 30 for supplying pressurized gas lubricant 22 to the system. The pressurized gas lubricant 22 delivery system will be described in more detail when describing other embodiments.

FIG. 3B is a front view of an embodiment of a hybrid thrust bearing 16 which includes the same components shown in FIG. 3A. Bearing pads 24 are shown as four pads positioned along the circumferential direction in the plane of rotation and facing bearing runner 20. It should be understood that hybrid thrust bearing 16 may have a single O-shaped bearing pad 24, or multiple smaller bearing pads 24, as shown in FIG. 3B. Bearing pads 24 have an arrangement of gas delivery orifices 40 through which pressurized gas lubricant 22 flows to generate hydrostatic induced force to form a gas film between the two surfaces. The gas delivery orifices may be on the surface of bearing pads 24, or may be recessed, offset from the thrust face 56 of the bearing pads 24. The bearing pad 24 may also be made of a gas-permeable porous media configured such that the pressurized gas lubricant 22 flows through the bearing pad 24. As shown in FIG. 3B, the illustrated embodiment of hybrid thrust bearing 16 has four gas inlets 30 and four mounting studs 36, spaced equally around the axis of rotation. It should be understood that hybrid thrust bearing 16 may have more gas inlets 30 and mounting studs 36, or fewer gas inlets 30 and mounting studs 36. Similarly, hybrid thrust bearing 16 need not have the same number of gas inlets 30 and mounting studs 36. Gas inlets 30 and mounting studs 36 also do not have to be equally spaced around a circumference of the bearing.

Figure 4A:
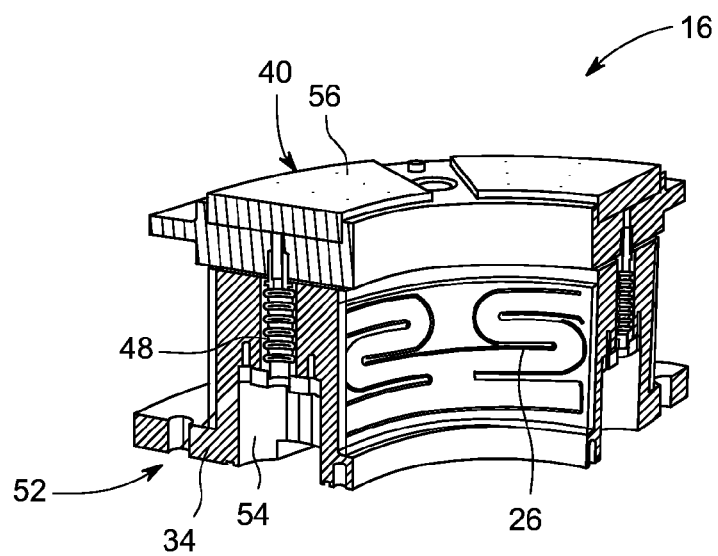
FIG. 4A is a quarter-section view showing an embodiment of a gas delivery system in a hybrid thrust bearing in accordance with aspects of the present disclosure.
Figure 4B:
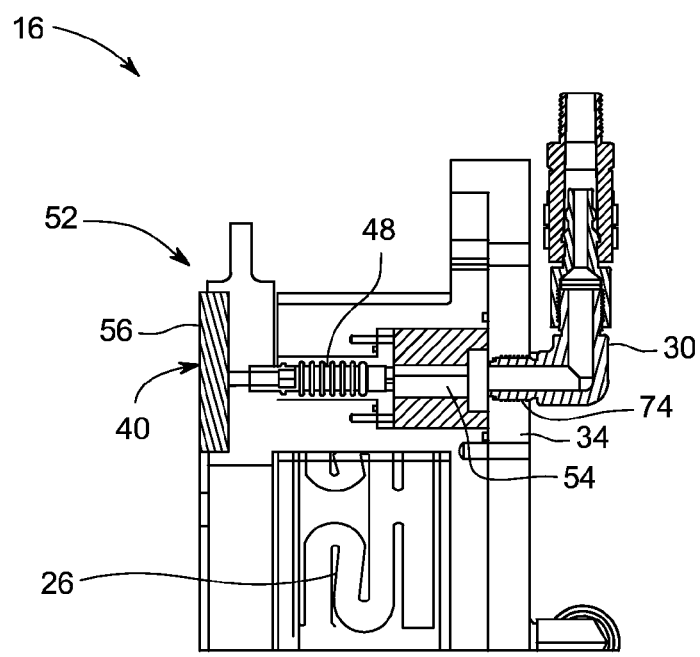
FIG. 4B is a detail section view showing an embodiment of a gas delivery system in a hybrid thrust bearing in accordance with aspects of the present disclosure.

FIGS. 4A and 4B show section views of one embodiment of a gas delivery system 52 in hybrid thrust bearing 16. FIG. 4A is a quarter-section view showing an embodiment of a gas delivery system 52 in a hybrid thrust bearing 16. In the illustrated embodiment, gas delivery system 52 includes gas inlet 30, gas supply port 74, back plate 34, cavity 54, bellow 48, and gas delivery orifices 40. Pressurized gas lubricant 22 is fed by gas inlet 30 through gas supply port 74 in back plate 34 and into cavity 54. Pressurized gas lubricant 22 may be a process gas from elsewhere in turbomachine 10, from another turbomachine, or a gas used solely as a bearing lubricant. Furthermore, pressurized gas lubricant 22 may be pressurized by drawing pressure off of some part of turbomachine 10, drawing pressure off of another turbomachine, a compressor, a buffer tank, or some other source of pressure. A flexible element, in this case bellow 48, seals the flow passage between bearing pad 24 and cavity 54. Bellow 48 is flexible so the seal is not broken when bearing pad 24 and back plate 34 move relative to one another as a result of flexure in compliant spring 26. Pressurized gas lubricant 22 then travels up through gas delivery orifices 40 to the thrust face 56 of bearing pad 24. The gas delivery orifices may be on the surface of bearing pads 24, or may be recessed, offset from the thrust face 56 of the bearing pads 24. The bearing pad 24 may also be made of a gas-permeable porous media configured such that the pressurized gas lubricant 22 flows through the bearing pad 24.

FIG. 4B is a detail section view showing the same embodiment of gas delivery system 52 in hybrid thrust bearing 16 shown in FIG. 4A. Pressurized gas lubricant 22 is fed into gas supply port 74 by gas inlet 30. The gas fills cavity 54, travels up through bellow 48 and gas delivery orifices 40, to the thrust face 56 of bearing pad 24.

Figure 5A:
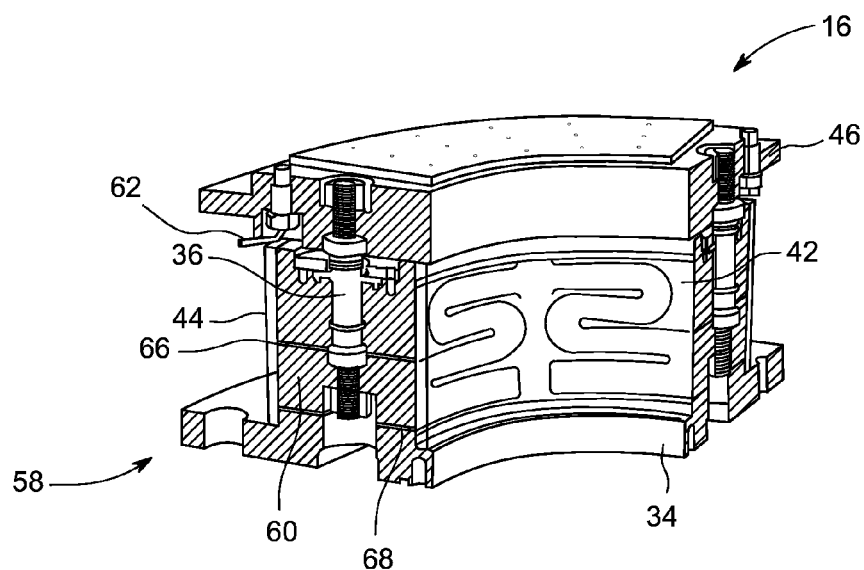
FIG. 5A is a quarter section view showing an embodiment of a mounting and damping system in a hybrid thrust bearing in accordance with aspects of the present disclosure.
Figure 5B:
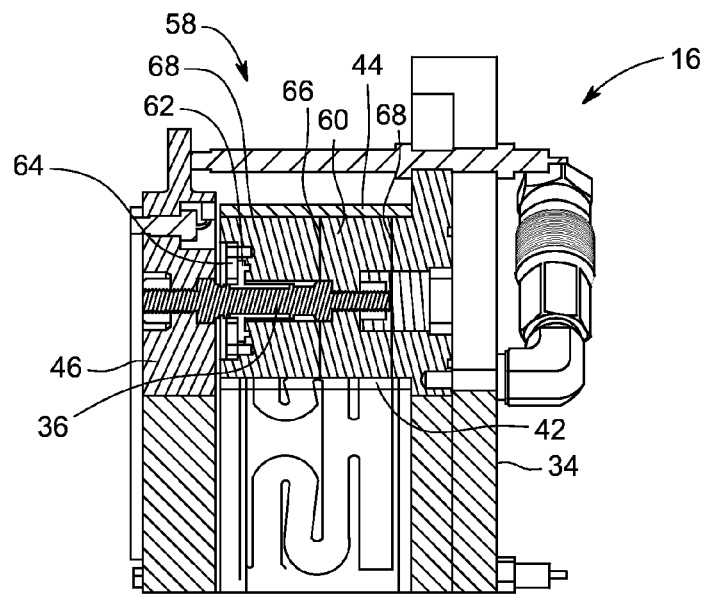
FIG. 5B is a detail section view showing an embodiment of a mounting and damping system in a hybrid thrust bearing in accordance with aspects of the present disclosure.

FIGS. 5A and 5B show section views of one embodiment of a mounting and damping system 58 in hybrid thrust bearing 16. FIG. 5A is a quarter section view showing an embodiment of the combined mounting and damping system 58. It should be understood that though the system shown in FIGS. 5A and 5B accomplishes both mounting and damping, two separate systems could also be used to accomplish mounting and damping. The illustrated embodiment of mounting and damping system 58 includes back plate 34, inside damper seal 42, outside damper seal 44, first volume 66, second volume 68, damper plunger 60, mounting stud 36, diaphragm 62, compression plate 64, and bearing pad housing 46. The damping system 58 used in this embodiment uses two hermetically sealed volumes 66 and 68 and a damper plunger 60, having a clearance between the inside and outside damper seals and the damper plunger, which restricts or allows fluid flow between the volumes 66 and 68. This is but one method to accomplish damping in hybrid thrust bearing 16. Other damping methods will be described in detail in other embodiments. In the present embodiment, hermetically sealed first volume 66 and second volume 68 are formed by inside damper seal 42, outside damper seal 44, and the damper plunger 60. The mounting stud 36 is fastened to the damper plunger and thrust face 46. The mechanical connection between the damper plunger and thrust face enables the transmission of vibratory motion from the rotor system to the bearing damper. The system is held in place by compression plate 64. When compliant springs 26 compress, damper plunger 60 moves and fluid is allowed to flow from first volume 66 to second volume 68.

FIG. 5B is a detail section view showing the embodiment of mounting and damping system 58 shown in FIG. 5A and described above. Elastomeric diaphragms 62 on mounting stud 36 prevent oil from leaking out of the cavities, but allow the mounting stud 36 to move. The damper plunger defines two thin flow paths connecting the first volume 66 and second volume 68. When compliant spring 26 flexes, fluid flows through the two thin flow paths between first volume 66 and second volume 68. It should be understood that this is only one way to damp hybrid thrust bearing 16, and not intended to limit the scope of the claims. Additional damping embodiments will be discussed when other embodiments are described.

Figure 6C:
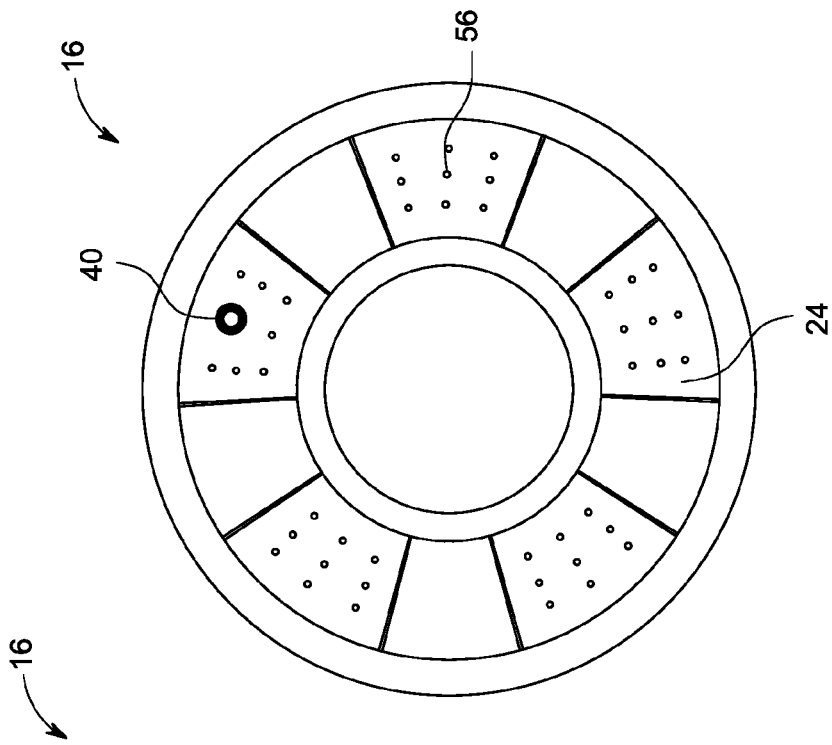
FIG. 6C is a rear view showing an embodiment of a hybrid thrust bearing having a wire mesh damper in accordance with aspects of the present disclosure.
Figure 6B:
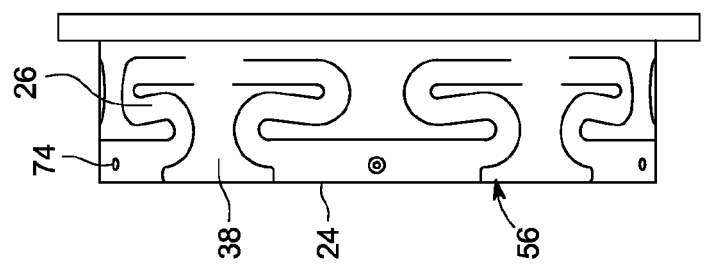
FIG. 6B is a side view showing an embodiment of a hybrid thrust bearing having a wire mesh damper in accordance with aspects of the present disclosure.
Figure 6A:
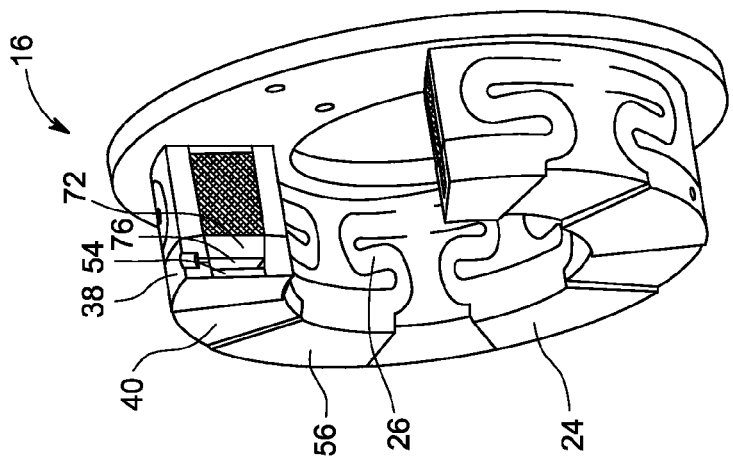
FIG. 6A is a section view showing an embodiment of a hybrid thrust bearing having a wire mesh damper in accordance with aspects of the present disclosure.

FIGS. 6A, 6B, and 6C show various views of an embodiment of a hybrid thrust bearing 16 with a wire mesh damper 72. FIG. 6A is a section view showing an embodiment of a hybrid thrust bearing 16 having a wire mesh damper 72, rather than the two volume mounting and damping system 58 shown in FIGS. 5A and 5B that uses fluid flow for damping. Wire mesh dampers 72 are manufactured by weaving and successively compressing a strip of intertwined metal wires or metal fabric to form a densely packed ring or segment. Rather than performing damping by allowing or restricting fluid flow between two volumes, wire mesh damper 72 dissipates energy by cyclic deformation of the wires (structural damping) and relative motion between the wires (Coulomb Friction damping). In the present embodiment, S-shaped compliant springs 26 are machined by EDM into bearing housing 38. Wire mesh damper 72 sits inside bearing housing 38 and on top of back plate 34. On top of wire mesh damper 72 is cover plate 76, which seals gas cavity 54 off from wire mesh damper 72. Pressurized gas lubricant 22 flows from cavity 54 through gas delivery orifices 40 to the thrust face 56 of bearing pad 24 in order to lubricate hybrid thrust bearing 16. The gas delivery orifices may be on the surface of bearing pads 24, or may be recessed, offset from the thrust face 56 of the bearing pads 24. The bearing pad 24 may also be made of a gas-permeable porous media configured such that the pressurized gas lubricant 22 flows through the bearing pad 24.

FIG. 6B is a side view showing the embodiment of hybrid thrust bearing 16 from FIG. 6A having a wire mesh damper. Unlike previous embodiments shown, the present embodiment has gas supply ports 74 on the side of the hybrid thrust bearing 16 rather than on the bottom. It should be understood that gas supply ports 74 may be located anywhere on hybrid thrust bearing 16 and need not be on the bottom or on the side of hybrid thrust bearing 16. In this embodiment, gas inlets 30 feed pressurized gas lubricant 22 into gas supply ports 74 disposed on bearing housing 38.

FIG. 6C is a front view showing the embodiment of hybrid thrust bearing 16 from FIGS. 6A and 6B having a wire mesh damper 72. As previously discussed, pressurized gas lubricant 22 flows through gas delivery orifices 40 to the thrust face 56 of bearing pads 24 in order to lubricate the bearing.

Figure 7A:
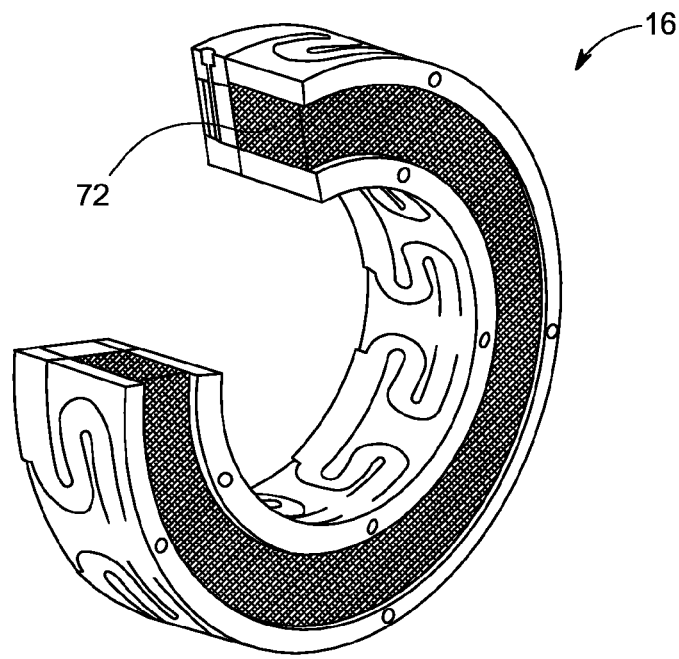
FIG. 7A is a section view showing an embodiment of a hybrid thrust bearing having a full ring wire mesh damper in accordance with aspects of the present disclosure.
Figure 7B:
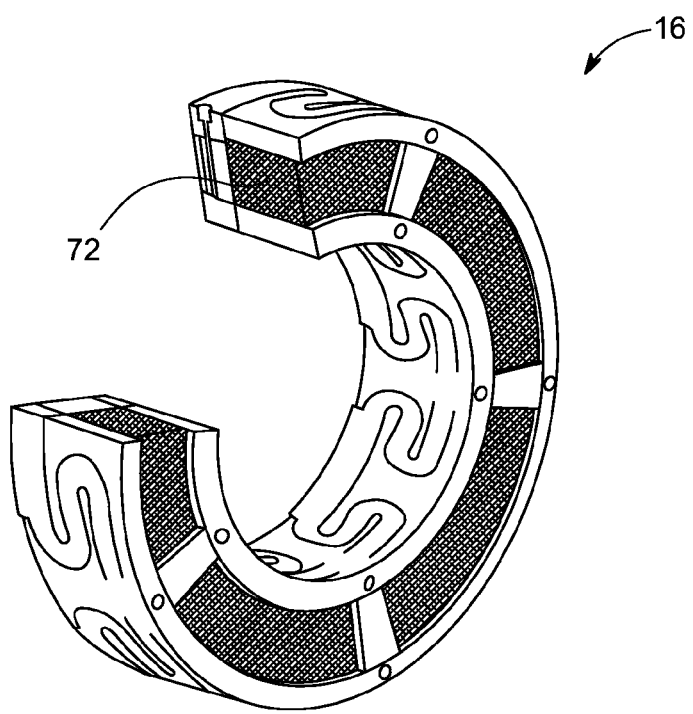
FIG. 7B is a section view showing an embodiment of a hybrid thrust bearing having a segmented wire mesh damper in accordance with aspects of the present disclosure.

FIGS. 7A and 7B show two embodiments of wire mesh damper 72. FIG. 7A is a section view showing hybrid thrust bearing 16 having a full ring wire mesh damper 72. Alternatively, FIG. 7B illustrates an embodiment of a hybrid thrust bearing 16 having a segmented wire mesh damper 72. It should be understood that wire mesh damper 72 may be a single ring-shaped piece, or any number of segments.

FIGS. 8A, 8B, and 8C depict an embodiment of hybrid thrust bearing 16 having wire mesh damper 72 and cantilevered compliant springs 26 machined into bearing housing 38. As can be seen in FIG. 8A, the present embodiment of hybrid thrust bearing 16 has full ring wire mesh damper 72 and cantilevered compliant springs 26 machined into bearing housing 38. It should be understood that while FIG. 8A depicts a full ring wire mesh damper 72, use of a segmented wire mesh damper is also possible. Similarly, in FIG. 8A, bearing housing 38 is only on the outside of wire mesh damper 72, rather than inside and outside as shown in FIGS. 7A and 7B. As a result, cantilevered compliant springs 26 are only outside of wire mesh damper 72, rather than outside and inside wire mesh damper 72, like the S-shaped compliant springs 26 shown in FIGS. 7A and 7B. It should be understood that this difference is not intended to be limiting, but merely to illustrate different ways to implement compliant springs 26. Compliant springs 26 may be of any shape, and may be interior of wire mesh damper 72, exterior of wire mesh damper 72, or both interior and exterior of wire mesh damper 72.

FIG. 8B is a side view of an embodiment of a hybrid thrust bearing 16 having a wire mesh damper 72 and cantilevered compliant springs 26. As with the embodiments depicted in FIGS. 6A, 6B, and 6C, pressurized gas lubricant 22 is supplied to the hybrid thrust bearing 16 through gas supply port 74 on the side of the bearing. Rather than each bearing pad 24 having many gas delivery orifices 40, each bearing pad 24 may have a single gas delivery orifice 40, as shown in FIG. 8A. It should be understood that a bearing pad 24 may have any number of gas delivery orifices 40, for example 1, 5, 10, 50, 100, or 500. Furthermore, each bearing pad 24 may have one or more recesses 80, each with one or more gas delivery orifices 40. Alternatively, hybrid thrust bearing 16 may have bearing pads 24 entirely without recesses 80.

FIG. 8C is a front view of an embodiment of a hybrid thrust bearing 16 having a wire mesh damper 72 and a cantilevered compliant spring 26. As can be seen in FIG. 8C, hybrid thrust bearing 16 has six thru holes 78 drilled into bearing housing 38 between bearing pads 24. It should be understood that FIG. 8C is not intended to limit hybrid thrust bearing 16 to a configuration with six bearing pads 24 and six thru holes 78. Rather, hybrid thrust bearing 16 may have any number of bearing pads 24 and thru holes 78. Furthermore, the number of bearing pads 24 and thru holes 78 need not be equal.

Technical effects of the invention include a bearing utilizing pressurized gas lubricant, a compliant structure, and damping. Technical effects further include gas-lubricated thrust bearings that utilize both hydrodynamic action and hydrostatic pressure. Technical effects also include gas-lubricated thrust bearings suitable for use in high powered (e.g., in excess of 3,000 kW) turbomachinery.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A thrust bearing comprising:
a compliant bearing housing;
one or more bearing pads coupled to the compliant bearing housing, the one or more bearing pads each having a thrust face;
a gas delivery system configured to supply a pressurized gas lubricant to the thrust face of the one or more bearing pads; and
a damping system configured to operate in parallel with the compliant bearing housing.

2. The thrust bearing of claim 1, wherein the thrust bearing is configured to attach to a rotor disposed inside of a turbomachine.

3. The thrust bearing of claim 1, wherein the gas delivery system comprises:
a gas inlet configured to supply a pressurized gas lubricant to the bearing through a gas supply port;
a flexible bellow through which the pressurized gas lubricant flows; and
one or more gas delivery orifices through which pressurized gas lubricant flows to reach the thrust face of the one or more bearing pads.

4. The thrust bearing of claim 1, wherein the bearing housing comprises one or more compliant springs machined into the bearing housing by electrical discharge machining.

5. The thrust bearing of claim 4 wherein the one or more compliant springs are S-shaped.

6. The thrust bearing of claim 4 wherein the one or more compliant springs are cantilevered.

7. The thrust bearing of claim 1, the damping system comprising a damper plunger separating a first volume and a second volume, the damper plunger defining a restrictive path between the first volume and the second volume, wherein the damper plunger is configured to move between the first volume and the second volume when the compliant bearing housing flexes, allowing or restricting fluid flow between first volume and second volume.

8. The thrust bearing of claim 1, the damping system comprising a wire mesh damper.

9. The gas-lubricated thrust bearing of claim 8, wherein the gas delivery system comprises:
a gas supply port disposed on a side of the bearing housing;
a cover plate disposed between the wire mesh damper and a cavity; and
one or more gas delivery orifices configured to allow pressurized gas lubricant to flow from the cavity to the thrust face of the bearing.

10. A gas-lubricated thrust bearing for use in turbomachinery comprising:
a thrust face;
a gas delivery system configured to supply a pressurized gas lubricant to the thrust face;
one or more compliant springs coupled to the thrust face; and
a damping system configured to operate in parallel with the compliant springs.

11. The gas-lubricated thrust bearing of claim 10, wherein the one or more compliant springs comprise S-shaped springs machined by electro discharge machining.

12. The gas-lubricated thrust bearing of claim 10, the damping system comprising a damper plunger separating a first volume and a second volume, the damper plunger defining a restrictive path between the first volume and the second volume, wherein the damper plunger is configured to move between the first volume and the second volume when the compliant bearing housing flexes, allowing or restricting fluid flow between first volume and second volume.

13. The gas-lubricated thrust bearing of claim 10, the damping system comprising a wire mesh damper.

14. The gas-lubricated thrust bearing of claim 13, wherein the wire mesh damper is segmented.

15. A turbomachine comprising:
a thrust bearing comprising:
one or more bearing pads, each of the one or more bearing pads comprising a thrust face;
a gas delivery system configured to supply a pressurized gas lubricant to the thrust face of the one or more bearing pads;
a compliant bearing housing coupled to the bearing pads; and
a damping system configured to operate in parallel with the compliant bearing housing.

16. The turbomachine of claim 15 further comprising a buffer tank configured to keep the pressurized gas lubricant pressurized when the turbomachine is not running.

17. The turbomachine of claim 15, wherein the pressurized gas lubricant is a process fluid.

18. The turbomachine of claim 15, wherein the pressurized gas lubricant is a process fluid drawn off a location in the turbomachine.

19. The turbomachine of claim 15, wherein the gas delivery system further comprises one or more recessed gas delivery orifices that are offset from the thrust face of the bearing pad.

20. The turbomachine of claim 15, the one or more bearing pads further comprising a gas-permeable porous media.

* * * * *